(12) United States Patent
Chen et al.

(10) Patent No.: US 7,813,644 B2
(45) Date of Patent: Oct. 12, 2010

(54) OPTICAL DEVICE WITH A STEERABLE LIGHT PATH

(75) Inventors: Chungte W. Chen, Irvine, CA (US); Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 1237 days.

(21) Appl. No.: 10/843,514

(22) Filed: May 10, 2004

(65) Prior Publication Data
US 2005/0249502 A1 Nov. 10, 2005

(51) Int. Cl.
*H04B 10/00* (2006.01)
*H04B 10/24* (2006.01)

(52) U.S. Cl. .............. 398/128; 398/118; 398/129; 398/130; 398/131; 244/3.1; 244/3.13; 244/3.17; 359/831

(58) Field of Classification Search ......... 398/118–152; 244/3.16, 3.15; 250/341; 359/569–837; 455/194.1; 102/213
See application file for complete search history.

(56) References Cited

U.S. PATENT DOCUMENTS

| | | | |
|---|---|---|---|
| 2,818,765 A | 1/1958 | Foster | |
| 4,326,799 A * | 4/1982 | Keene et al. | 356/141.1 |
| 4,383,663 A * | 5/1983 | Nichols | 244/3.16 |
| 4,407,464 A | 10/1983 | Linick et al. | |
| 4,497,065 A * | 1/1985 | Tisdale et al. | 382/103 |
| 4,716,287 A * | 12/1987 | Nestler | 250/227.13 |
| 5,625,499 A * | 4/1997 | Chen | 359/831 |
| 5,652,681 A * | 7/1997 | Chen et al. | 359/831 |
| 5,838,014 A * | 11/1998 | Cabib et al. | 250/504 R |
| 5,874,727 A * | 2/1999 | Harraeus et al. | 250/203.1 |
| 5,964,432 A * | 10/1999 | Obkircher | 244/3.16 |
| 6,327,063 B1 * | 12/2001 | Rockwell | 398/122 |
| 6,343,767 B1 * | 2/2002 | Sparrold et al. | 244/3.16 |
| 6,344,937 B1 | 2/2002 | Sparrold et al. | |
| 6,469,846 B2 * | 10/2002 | Ebizuka et al. | 359/837 |
| 6,470,116 B2 * | 10/2002 | Kim et al. | 385/37 |
| 6,552,851 B2 * | 4/2003 | Katsuma | 359/569 |
| 6,618,177 B1 * | 9/2003 | Kato et al. | 398/129 |
| 2003/0035214 A1 * | 2/2003 | Pandya | 359/571 |
| 2003/0183784 A1 * | 10/2003 | Kongable | 250/504 R |
| 2004/0081466 A1 * | 4/2004 | Walther et al. | 398/152 |
| 2005/0035295 A1 * | 2/2005 | Bouma et al. | 250/341.1 |
| 2005/0195505 A1 * | 9/2005 | Braun et al. | 359/837 |

OTHER PUBLICATIONS

Snell Law—from the Wikipedia, the free encyclopedia, Jan. 18, 2007, pp. 1-6.*
Weber et al: "Diffractively corrected Risley prism for infrared imaging", Proceedings of SPIE, vol. 4025, Apr. 2000, pp. 79-86.*

* cited by examiner

Primary Examiner—Li Liu

(57) ABSTRACT

A steerable-light-path optical device includes a light transceiver having an external light path associated therewith, and a path-steering device that controls the direction of the light path relative to a steering axis. The path-steering device has a first beam-deviation optical element including a first prism structure having a first diffraction grating thereon, and a second beam-deviation optical element including a second prism structure having a second diffraction grating thereon. The steering axis passes through the first and second beam-deviation optical elements. A rotational drive is operable to rotate at least one of the first beam-deviation optical element and the second beam-deviation optical element, and preferably both of the beam-deviation optical elements, about the steering axis.

48 Claims, 5 Drawing Sheets

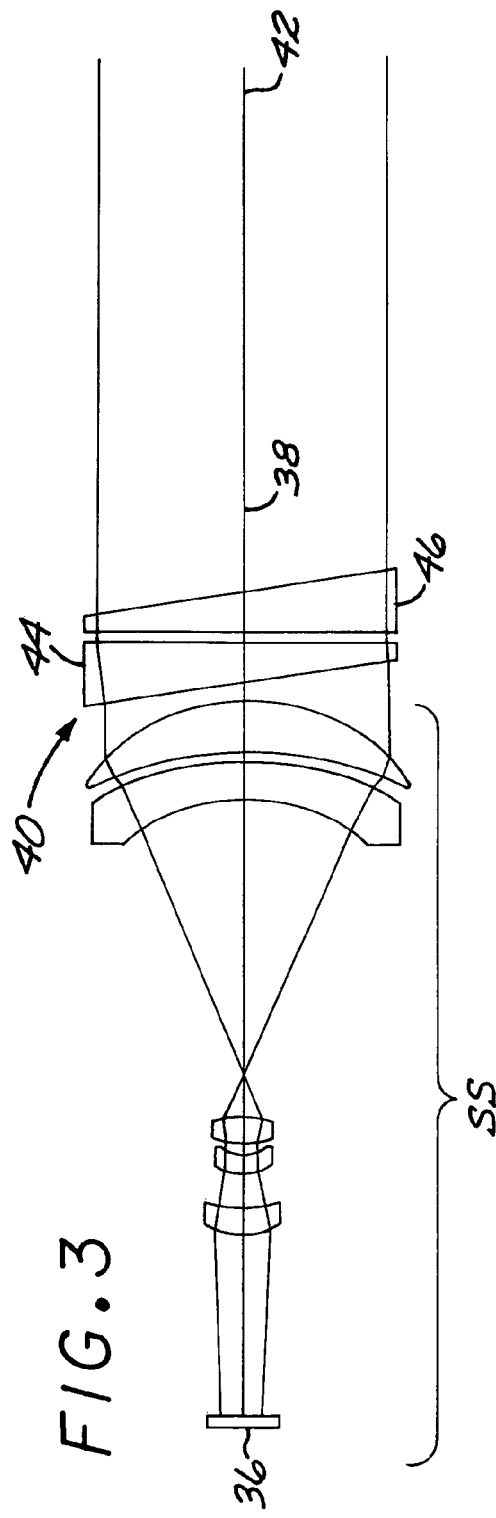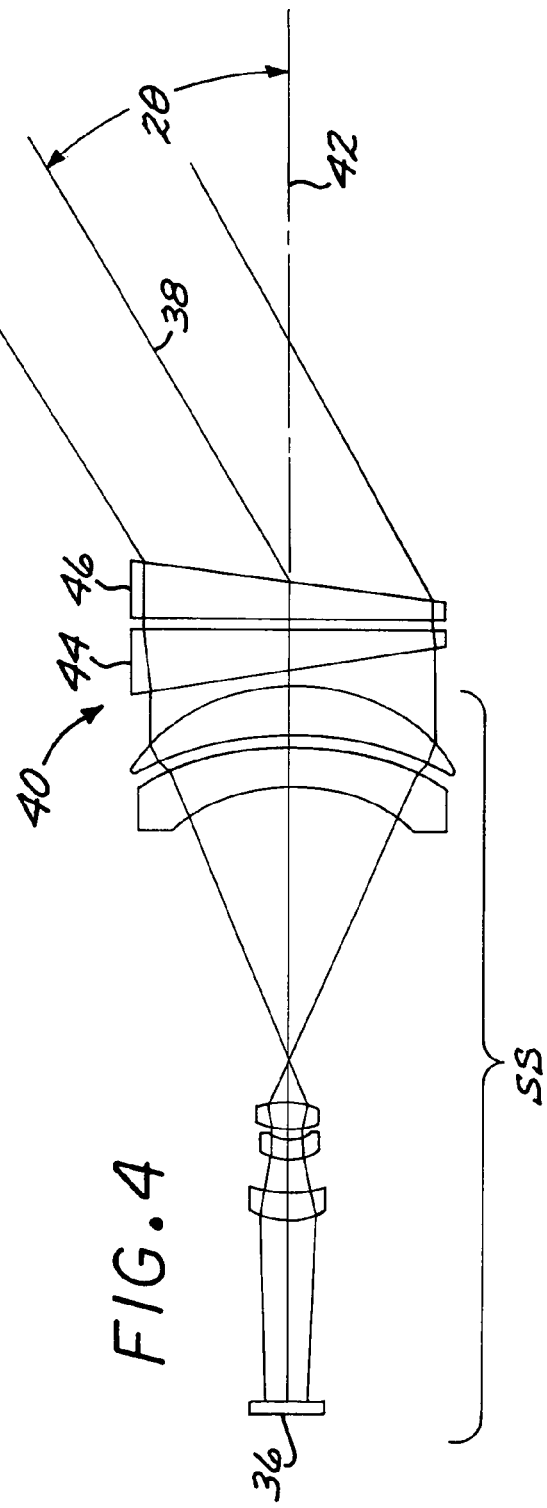

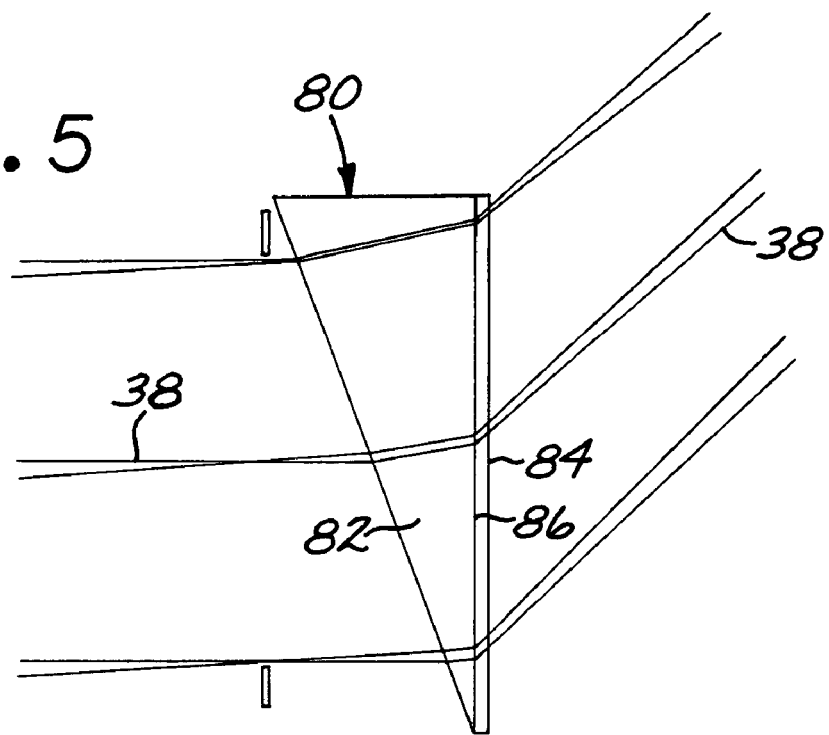
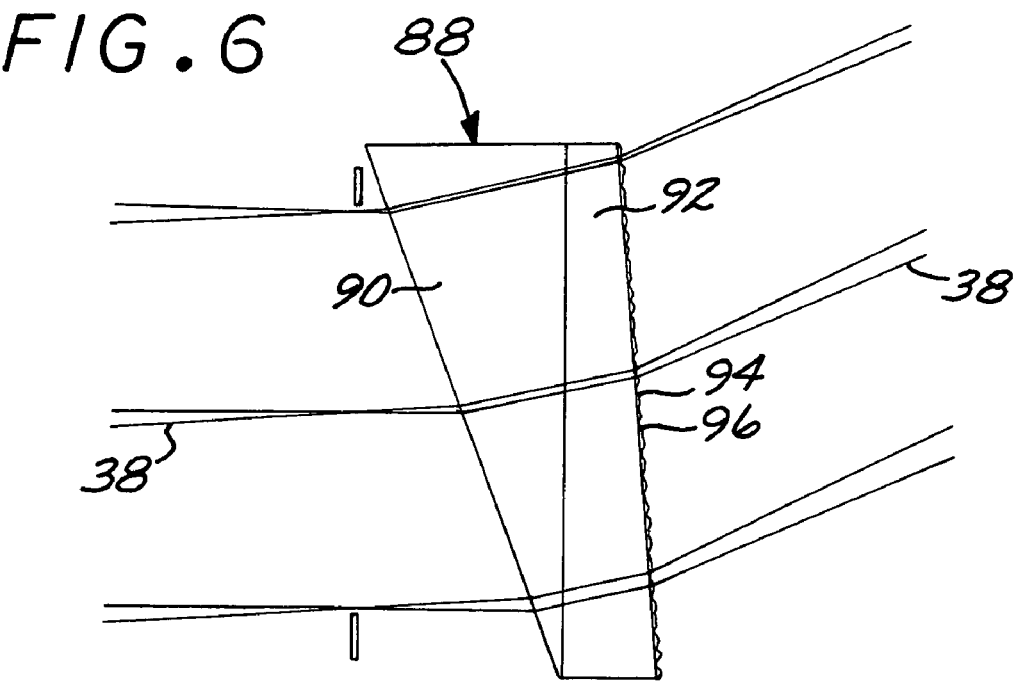

OPTICAL DEVICE WITH A STEERABLE LIGHT PATH

This invention relates to an optical device having a light transceiver that sends and/or receives a light beam and, more particularly, to the steering of the light path along which the light beam travels.

BACKGROUND OF THE INVENTION

Some optical devices include a light transmitter and/or a light receiver, collectively termed a light transceiver, that transmits and/or receives a light beam. The light transceiver may be pointed in a specific direction to select the direction of the light path along which the light beam that is transmitted and/or received. An example of a light transmitter is a laser rangefinder or illuminator, and an example of a light receiver is a light sensor such as a focal plane array. Some light transceivers may include both a light transmitter and a light receiver.

In each case of this type of optical device, the light transceiver is pointable in a selected direction. For the case where the light transceiver is a light transmitter, the outgoing light beam is pointed or steered in the selected direction. For the case where the light transceiver is a light receiver, the light receiver is pointed to select the angle of the incoming light beam.

The pointing or steering may be accomplished either by mounting the light transceiver on a gimbal or by keeping the orientation of the light transceiver fixed in space and altering the direction of the light path using an optics subsystem that employs mirrors, lenses and the like mounted on a gimbal but with the light transceiver mounted off the gimbal. The latter approach with the light transceiver mounted off the gimbal is preferred, because it usually results in a lower mass that must be pivoted and a lower total mass. Two-dimensional X-Y pivoting gimbals or roll-nod gimbals are widely used in seeker systems.

The optical device of this type is typically positioned behind a window that protects the optical device. The window must be sufficiently large that the light path may be pointed to the required maximum pointing angle and still pass through the transparent window. Because of the relatively large size of the gimbal, the gimbal must be well-spaced behind the interior surface of the window to provide mechanical clearances during the pivoting. The result is that the window must be relatively large to accommodate the gimbal and also allow the light path to be steered to the required maximum pointing angle.

The requirement for a large window has several undesirable effects. First, the larger the window, the more expensive it is to produce with the required high optical quality. The large window also adds a substantial amount of weight to the structure, an important concern for some types of applications such as light transceivers in lightweight unmanned aerial vehicles. For military applications where stealth is desirable, the larger window typically increases the radar and infrared signatures of the platform (e.g., the aircraft) on which the optical device is mounted.

For many of the applications of the optical devices of this type, the light transceiver must operate at two or more wavelengths. For example, a laser illuminator that transmits a laser beam may operate at a wavelength of 1.55 micrometers, and an associated infrared receiver may operate in the medium-wavelength infrared (MWIR) band of 3-5 micrometers or in the long-wavelength infrared (LWIR) band of 8-12 micrometers. It is desirable that any beam-steering device be optically functional at the required two or more wavelengths. Some possible steering approaches can in principle reduce the window size, but have so much chromatic aberration that they are satisfactory only for a single wavelength or a narrow wavelength band.

There is thus a need for an optical device with beam-steering capability that allows the size of the window to be reduced, and also permits operation at two or more wavelengths which may be widely separated in the optical spectrum. The present invention fulfills this need, and further provides related advantages.

SUMMARY OF THE INVENTION

The present invention provides a steerable-beam optical device that allows an output light beam and/or an input light beam to be steered over an angular range. The steering structure is small in size and light in weight. It may be positioned close to a window so that the size of the window that is required for a selected maximum viewing angle, measured from the boresight, is relatively small. The steering structure has very low chromatic aberration, so that the present approach is suitable for compact, multi-wavelength applications.

In accordance with the invention, a steerable-light-path optical device comprises a light transceiver having an external light path associated therewith, and a path-steering device that controls the direction of the light path relative to a steering axis. The path-steering device comprises a first beam-deviation optical element including a first prism structure having a first diffraction grating thereon, wherein the steering axis passes through the first beam-deviation optical element, and a second beam-deviation optical element including a second prism structure having a second diffraction grating thereon, wherein the steering axis passes through the second beam-deviation optical element. The path-steering device further includes a rotational drive operable to rotate at least one of the first beam-deviation optical element and the second beam-deviation optical element about the steering axis.

The light transceiver may be a light transmitter or a light receiver, or it may have both functionalities. The present approach is operable where the light transceiver operates at a single wavelength. However, its greatest benefits are realized when the light transceiver operates at two or more wavelengths, such as two or more discrete wavelengths, two or more wavelength bands, or a combination thereof, due to the reduced chromatic aberration.

In an example, the light transceiver may transmit a first light beam at a first wavelength, and may receive a second light beam at a second wavelength. The first light beam and the second light beam are preferably substantially parallel to each other and to the light path. They may be substantially coincident with each other and with the light path. The light transceiver may comprise a light receiver operable at more than one wavelength, in the ultraviolet, visible, and/or infrared wavelength ranges.

The first beam-deviation optical element preferably comprises a first-structure prism having the first diffraction grating on a surface thereof. The first beam-deviation optical element may comprise a single (i.e., exactly one) first-structure prism having the first diffraction grating on a surface thereof. The first beam-deviation optical element may instead comprise at least two first-structure prisms (i.e., exactly two, or more than two prisms), wherein the first diffraction grating is on a surface of one of the first-structure prisms. Where the first beam-deviation optical element comprises at least two first-structure prisms, desirably each of the first-structure prisms is made of a transparent material having an index of refraction different from the index of refraction of the other first-structure prisms. Preferably, the second beam-deviation optical element comprises at least two second-structure prisms, and the second diffraction grating is on a surface of one of the second-structure prisms. The diffraction gratings may be blazed diffraction gratings.

The rotational drive is preferably operable to rotate both the first beam-deviation optical element and the second beam-deviation optical element about the steering axis. The two beam-deviation optical elements may be rotated together by the same amount as though locked together in a rotational sense. The two beam-deviation optical elements may instead be rotated separately and independently. The rotation of the two beam-deviation optical elements by the same amount sweeps the beam path about the steering axis, and the rotation of the two beam-deviation optical elements by different amounts changes the angle of the beam path relative to the steering axis.

In the usual case, there is a window through which the light path passes. The first beam-deviation optical element and the second beam-deviation optical element lie between the window and the light transceiver.

The present approach provides an optical device in which the light path may be steered without the use of a gimbal structure, by using the rotation of two beam-deviation optical elements. The use of the rotating beam-deviation optical elements allows the steering structure to be placed close to the window, so that the window may be made small in size. The weight of the steering structure is reduced as compared with the gimbal approach, an important advantage for light-weight aerial vehicles. The combined prism/grating structure of the beam-deviation optical elements reduces chromatic aberration in the light beam, so that the optical device is suitable for use with a light beam having two or more wavelengths.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 3 is a schematic view of the optics system of the optical device, in a first operating position;

FIG. 4 is a schematic view of the optics system of the optical device, in a second operating position;

FIG. 5 is a further enlarged view of a first embodiment of a beam-deviation optical element;

FIG. 6 is a further enlarged view of a second embodiment of a beam-deviation optical element.

DETAILED DESCRIPTION OF THE INVENTION

Figure 1:
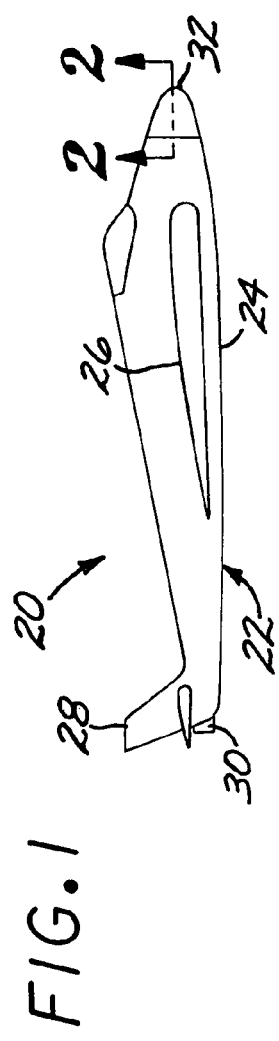
FIG. 1 is an elevational view of an aircraft utilizing an optical device according to an embodiment of the present invention.

FIG. 1 depicts an aircraft 20 having a fuselage 22 with a fuselage body 24, wings 26, and a tail 28. The aircraft 20 may be unpowered or, more preferably, is powered by an engine 30, such as a gas turbine engine, a rocket engine, or an engine driving a propeller. A transparent dome window 32, here shown in the nose of the aircraft, is joined to the fuselage body 24.

Figure 2:
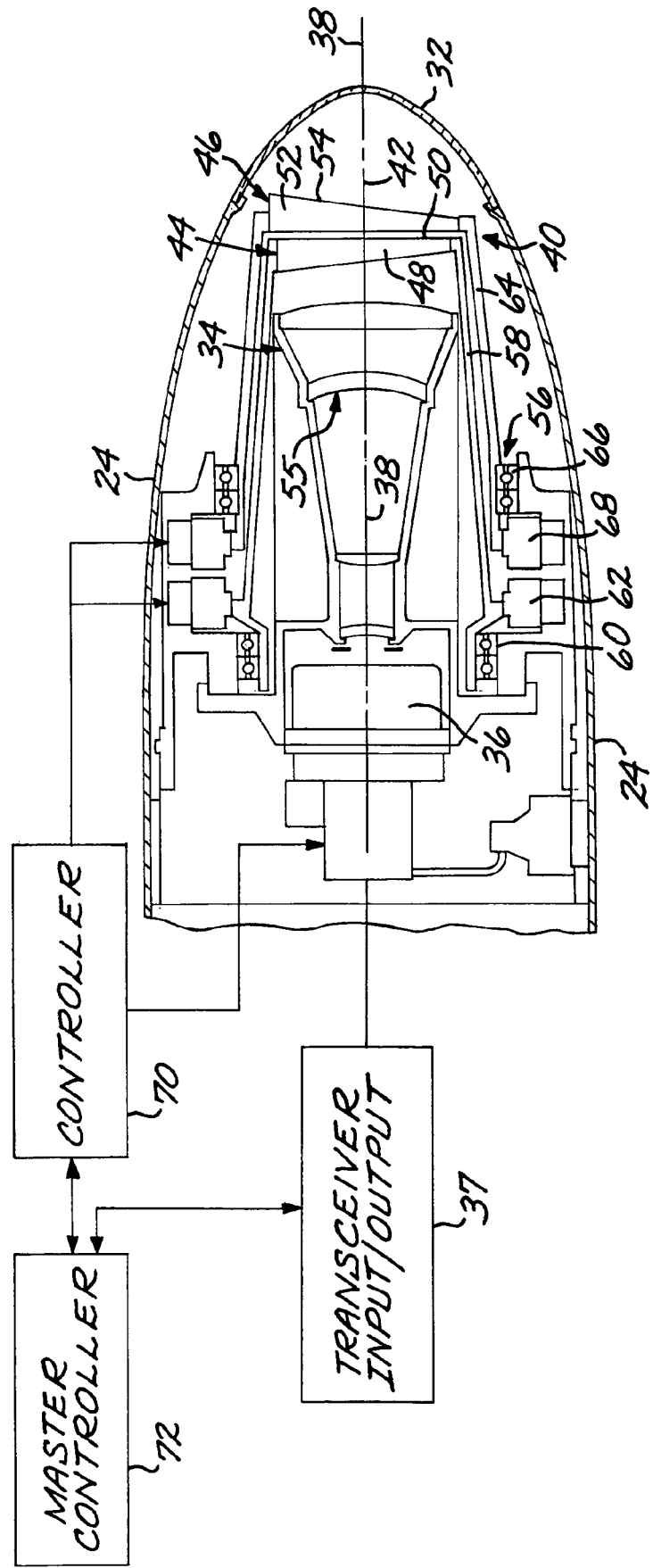
FIG. 2 is an enlarged schematic sectional view of a portion of the aircraft of FIG. 1 taken on line 2-2 of FIG. 1, illustrating the optical device in greater detail.

FIG. 2 is a schematic sectional view showing the interior of the fuselage 22 near the nose, and control elements. A steerable-light-path optical device 34 includes a light transceiver 36 having an external light path 38 associated therewith. The light transceiver 36 may comprise a light transmitter or a light receiver, or both. For example, the light transceiver 36 may include a laser or LED light source, or it may include a light detector. The light transceiver 36 may incorporate both functions, as for example a laser light transmitter in the form of a laser illuminator that produces an outgoing laser light beam, and also a focal plane array light detector of an incoming light beam. The light transceiver 36 communicates with a transceiver input/output 37 that provides the appropriate driving signal, in the case where the light transceiver 36 is a light transmitter, or a signal processing capability, in the case where the light transceiver 36 is a light receiver, or both.

In a typical case in which the greatest benefits of the present approach are realized, the light transceiver 36 is operable at two or more wavelengths. The "wavelengths" may be single, discrete wavelength values, or wavelength bands. For example, the light transceiver 36 may transmit a first light beam at a first wavelength, and receive a second light beam at a second wavelength. In another example, the light transceiver 36 may transmit a first light beam at a first wavelength, and transmit a second light beam at a second wavelength. In yet another example, the light transceiver 36 may receive a first light beam at a first wavelength, and receive a second light beam at a second discrete wavelength or a second wavelength band. The wavelengths of the light may be in the ultraviolet, the visible, or the infrared ranges. The wavelengths may be in the same or different wavelength ranges. To cite a specific example, the light transceiver 36 may transmit a laser beam at 1.06 or 1.55 micrometers wavelength, and simultaneously receive light in the medium wavelength infrared band of 3-5 micrometers wavelength or the long wavelength infrared band of 8-12 micrometers wavelength. To accomplish transmission and/or reception at different wavelengths, the light transceiver 36 typically includes different specific transmitting and/or receiving devices integrated together.

In these various approaches, the first light beam and the second light beam are substantially parallel to each other and to the light path 38. Preferably, the first light beam and the second light beam are substantially coincident with each other and with the light path, a special case of substantially parallel light beams. There may be a small deviation from perfectly parallel light beams due to the inverse wavelength dependence of the index of refraction. By "substantially parallel" is meant that the angle between the first light beam and the second light beam is less than about $\lambda/D$ degrees, where $\lambda$ is the wavelength and D is the diameter of the telescope (i.e., the lens/mirror system to be discussed subsequently). For many purposes, this small deviation from perfectly parallel light beams is acceptable. Where the small deviation is not acceptable, it may be corrected with an intervening optical device such as a Risley prism pair in the light path 38 on the input side of the light transceiver 36, or by calibrating the angular difference and storing the calibration information in the memory of the controllers that will be described subsequently to be used in correcting the beam steering information.

The optical device 34 further includes a path-steering device 40 that controls the direction (i.e., the angle) of the light path 38 relative to a steering axis 42, which is typically the boresight axis of the optical device 34. The path-steering device 40 comprises a first beam-deviation optical element 44, and a second beam-deviation optical element 46. The first beam-deviation optical element 44 includes a first prism structure 48 having a first diffraction grating 50 thereon, and the second beam-deviation optical element 46 includes a second prism structure 52 having a second diffraction grating 54 thereon. The diffraction gratings 50 and 54 may be symmetric diffraction gratings or asymmetric blazed diffraction gratings. The steering axis 42 passes through the first beam-deviation optical element 44 and the second beam-deviation optical element 46.

There is optionally but desirably a lens/mirror system 55 positioned along the steering axis 42 between the beam-deviation optical elements 44 and 46, on the one hand, and the light transceiver 36, on the other hand. The lens/mirror system 55 may include a single lens, multiple lenses, a single mirror, multiple mirrors, or combinations of mirrors and lenses. In the illustration of FIG. 2, there are multiple lenses selected to shape and focus the beam(s) traveling from and/or to the light transceiver 36.

Thus, a received light beam propagating toward the light transceiver 36 along the light path 38 passes successively through the dome window 32, the second beam-deviation optical element 46, the first beam-deviation optical element 44, and the lens/mirror system 55, prior to reaching the light transceiver 36. A transmitted light beam transmitted by the light transceiver 36 passes successively through the lens/mirror system 55, the first beam-deviation optical element 44, the second beam-deviation optical element 46, and the dome window 32. That is, the first beam-deviation optical element 44 and the second beam-deviation optical element 46 lie between the dome window 32 and the light transceiver 36, along the light path 38 and the steering axis 42.

The path-steering device 40 further includes a rotational drive 56 operable to rotate at least one of the first beam-deviation optical element 44 and the second beam-deviation optical element 46 about the steering axis 42. Preferably, the rotational drive 56 is operable to independently rotate both the first beam-deviation optical element 44 and the second beam-deviation optical element 46 about the steering axis 42. This preferred form of the rotational drive 56 is illustrated and will be described.

The rotational drive 56 includes a first support 58 that supports the first beam-deviation optical element 44 for controllable rotational movement on a first bearing set 60 for rotation about the steering axis 42. The first support 58 is rotationally driven about the steering axis 42 by a controllable first drive motor 62. The rotational drive 56 further includes a second support 64 that supports the second beam-deviation optical element 46 for controllable rotational movement on a second bearing set 66 for rotation about the steering axis 42. The second support 64 is rotationally driven about the steering axis 42 by a controllable second drive motor 68. The drive motors 62 and 68 are controlled by a controller 70, which may also provide control signals to the light transceiver 36 as appropriate. In a first operational mode, the controller 70 may drive the two drive motors 62 and 68 together so that the first beam-deviation optical element 44 and the second beam-deviation optical element 46 rotate together and in lockstep as a unit about the steering axis 42; that is, the first beam-deviation optical element 44 and the second beam-deviation optical element 46 rotate in the same circumferential direction and at the same rate. In a second operational mode, the controller 70 may drive the two drive motors 62 and 68 so that the first beam-deviation optical element 44 and the second beam-deviation optical element 46 rotate independently of and separately from each other and not in lockstep; that is, the first beam-deviation optical element 44 and the second beam-deviation optical element 46 do not rotate in the same circumferential direction and at the same rate. In one typical case of this second operational mode, one of the optical elements 44 or 46 is held in a fixed rotational position, and the other of the optical elements 46 or 44 is rotated about the steering axis 42. The functioning of the transceiver input/output 37 and the controller 70 are typically integrated by a master controller 72.

Details of the general structural and design features of other beam-control devices are found in U.S. Pat. Nos. 6,343,767 and 6,344,937, whose disclosures are incorporated by reference.

FIGS. 3-4 illustrate the manner in which the light path 38 is steered by controlling the rotation of the beam-deviation optical elements 44 and 46. For the purposes of this discussion of FIGS. 3-4, the light beam is described as coming from left to right, although it may be viewed as following the reciprocal path. In a first orientation illustrated in FIG. 3, the first beam-deviation optical element 44 introduces a deviation in the light path 38 of $+\theta$ relative to the steering axis 42, and the second beam-deviation optical element 44 introduces a deviation in the light path 38 of $-\theta$, so that the net deviation of the light path 38 is substantially 0 and the light path 38 is substantially coincident with the steering axis 42 to the right of the path-steering device 40. In a second orientation as illustrated in FIG. 4, the first beam-deviation optical element 44 is rotationally stationary with respect to the steering axis 42, and the second beam-deviation optical element 44 is rotated 180 degrees about the steering axis 42. The first beam-deviation optical element 44 introduces a deviation in the light path 38 of $+\theta$ relative to the steering axis 42, and the second beam-deviation optical element 44 introduces a deviation in the light path 38 of $+\theta$, so that the net deviation in the light path 38 is $+2\theta$ from the steering axis 42. Intermediate angular deviations between 0 and $+2\theta$ are achieved by cooperative intermediate relative rotations of the beam-deviation optical elements 44 and 46 between 0 and 180 degrees. This is the second operational mode discussed earlier. To sweep the light path 38 circumferentially (i.e., the $\phi$ direction) at a constant angular deviation from the steering axis 42 (the first operational mode discussed earlier), the angular deviation is established in the manner just described, and then the two beam-deviation optical elements 44 and 46 are rotated together (i.e., in a lockstep fashion, rotation in the same circumferential direction and by the same amount) about the steering axis 42. The combination of these two movements, the first movement where the beam-deviation optical elements 44 and 46 rotate relative to each other (the second operational mode) and the second movement where the beam-deviation optical elements 44 and 46 rotate together (the first operational mode), allows the light path to be controllably steered in the $\theta$ and $\phi$ angular directions and thereby aimed in an arbitrary angular direction relative to the steering axis 42.

FIGS. 5-6 illustrate two configurations, either of which may be used for either of the beam-deviation optical elements 44 and 46. In the embodiment of FIG. 5, a beam-deviation optical element 80 comprises a single prism 82 having a diffraction grating 84 on a surface 86 thereof. In this case, the diffraction grating 84 is fabricated and supplied as a separate article that is joined to the surface 86 of the single prism 82.

In the embodiment of FIG. 6, a beam-deviation optical element 88 comprises at least two prisms, in this case exactly two prisms 90 and 92 that are joined together. The diffraction grating 94 is on a surface 96 of one of the prisms, in this case the prism 92. In this case, the diffraction grating is formed directly in the surface 96 by ruling, etching, or the like, and not as a separate article that is joined to the surface 96.

In each of the embodiments of FIGS. 5 and 6, the angular deviation of the light path 38 that is introduced into the light beam as it passes through the beam-deviation optical element 80 or 88 is determined by the geometry of the prism(s), the material of construction of the prism(s), and the geometry of the rulings (e.g., symmetric or blazed asymmetric rulings) of the diffraction grating, according to known optical principles for the operation of prisms and diffraction gratings. The prism(s) are transparent to the wavelength(s) of interest of the light beam(s). The material of construction of the prism(s) determines the index (indices) of refraction η. Some examples of materials of construction include glass (available in different values of η ranging from 1.44 to 2.60) for visible light, and amtir1 (having a nominal composition of $Ge_{33}As_{12}Se_{55}$ and η of 2.5), zinc sulfide (ZnS, η of 2.25), silicon (Si, η of 3.4), calcium fluoride ($CaF_2$, η of 1.46), and germanium (Ge, η of 4.0) for infrared light of various wavelengths. For the embodiment of FIG. 6, the materials of construction of the two prisms 90 and 92 are preferably chosen to be different, so that the indices of refraction are different.

The diffraction grating 94 diffracts multiple orders for each incident wavelength. Another variable of the beam-deviation optical element 80, 88 that may be optimized is the selection of the specific diffraction order of the diffraction grating 94. When co-optimized with the other structure variables, the chromatic aberration of the path steering device 40 for two or more wavelengths may be minimized.

Figure 7:
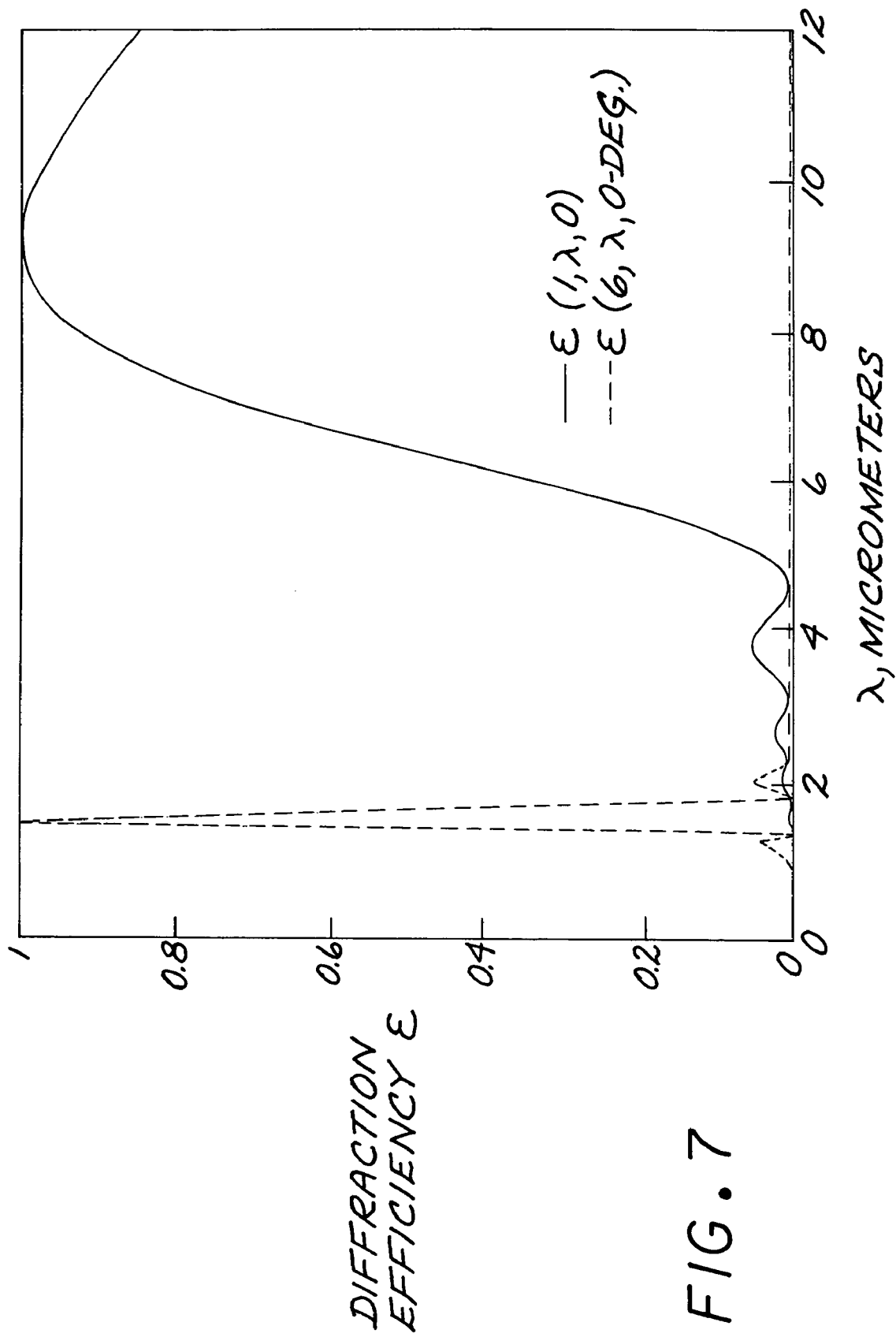
FIGS. 7-8 are graphs of diffraction efficiency as a function of wavelength for various conditions.

As an example of the design process, a path-steering device 40 was designed for operation with a bidirectional light transceiver 36 operating with a transmitting infrared wavelength of 1.55 micrometers wavelength, and a receiving infrared wavelength in the long wavelength infrared (LWIR) spectral band of 8-12 micrometers wavelength. The 1.55 micrometer wavelength is the wavelength of a laser rangefinder, and the 8-12 micrometers wavelength spectral band is the receiving wavelength of long wavelength infrared energy. The path-steering device 40 utilized two beam-deviation optical elements 44 and 46, each of the type shown in FIG. 6. Each of the beam-deviation optical elements used a prism 90 made of amtir1 and a prism 92 made of zinc sulfide. The performance of each of the prisms 90, 92 was optimized for the sixth diffraction order for the 1.55 micrometer wavelength, and for the first diffraction order for a wavelength of 9.3 micrometers in the long wavelength infrared spectral band. The diffraction efficiency at 0 degrees incident angle is presented in FIG. 7, showing that the diffraction efficiency is optimal for the selected wavelengths of 1.55 and 9.3 micrometers, yet is still good over the entire 8-12 micrometer range. The residual chromatic aberration is less than 16 micro-radians, much less than may be obtained from other refractive beam-steering structures. See also U.S. Pat. Nos. 5,625,499 and 5,652,681, whose disclosures are incorporated by reference.

Figure 8:
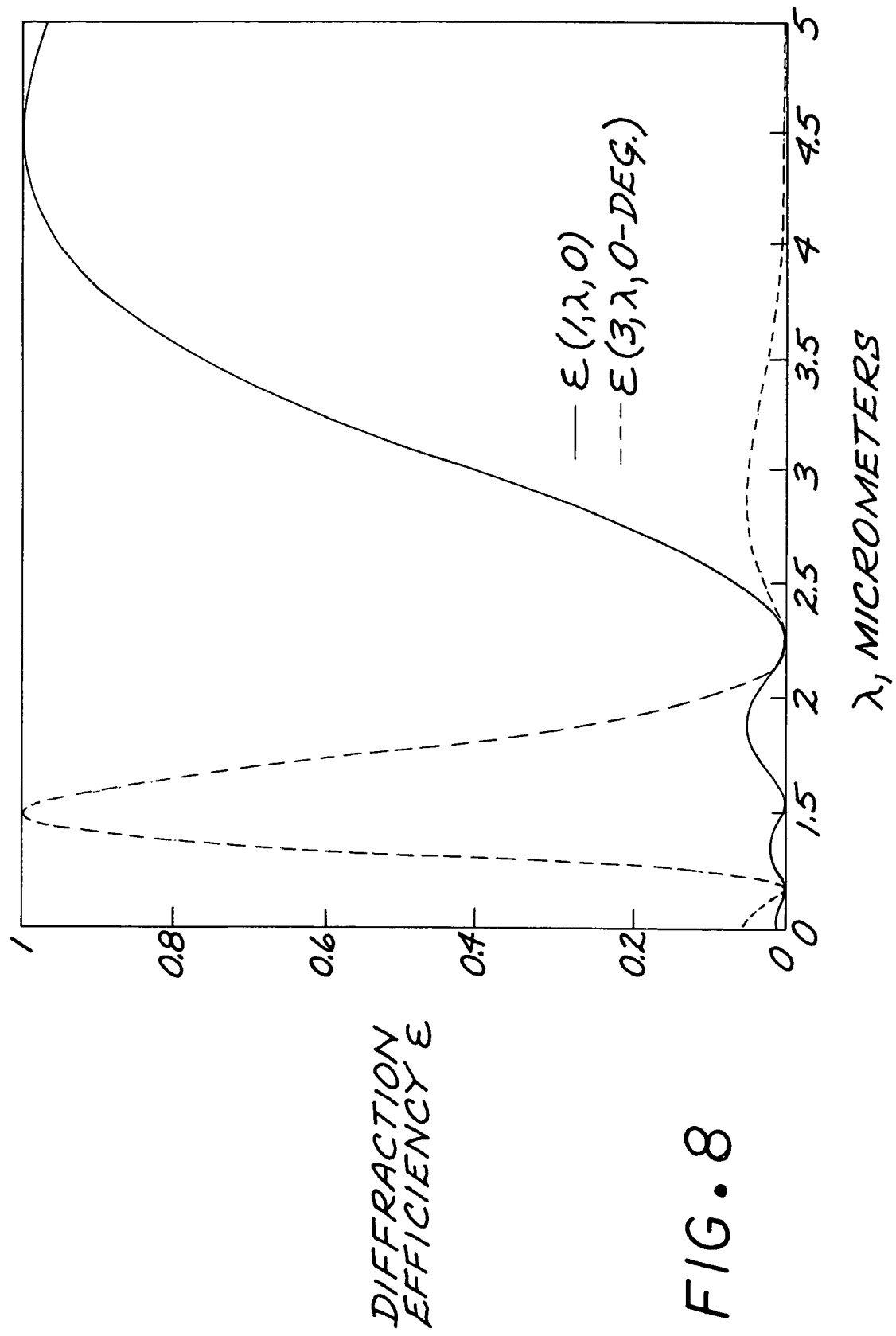

As an example of re-optimization, FIG. 8 illustrates the diffraction efficiency for the same structure except that the prism 90 is made of silicon and the prism 92 is made of calcium fluoride. The diffraction grating was optimized for diffraction of the third diffraction order for the 1.55 micrometer wavelength and the first diffraction order for a 4.5 micrometer wavelength in the medium wavelength infrared (MWIR) band of 3-5 micrometers wavelength. Again, performance over the entire MWIR band is good.

The present approach thus permits the design of an optical device having a beam-steering apparatus with a very low chromatic aberration for two or more wavelengths. The path-steering device uses only rotational movement about the steering axis 42, and does not involve any rotational movement about an axis perpendicular to the steering axis 42 as in gimbal designs. As a result, the path-steering device may be placed very close to the interior surface of the window 32. The required size of the window 32 is therefore smaller than for the case where the path is steered with a gimbal or other approach that is necessarily positioned further from the window 32 in order to provide the required mechanical clearances. This design permits the window of the present approach to be made smaller and lighter, and also with a smaller radar signature than the window used with the gimbal structure.

A quantitative assessment of the relative window area required for various beam-steering approaches has been performed for a 60 degree maximum pointing angle on either side of the boresight, for a total field of regard of 120 degrees. The window area required for the present approach is taken as 1.0, and the window areas for the other beam steering approaches are normalized to that value. The required normalized window areas are: 5.4 for a conventional gimbal, 1.5 for a fore-aft translating gimbal, 10.8 for a center-pivoted pointing mirror, and 2.5 for an edge-pivoted pointing mirror. That is, the required window area is at least ⅓ less for the present approach than for any of the other beam-steering techniques.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A steerable-light-path optical device, comprising:
   a light transceiver having an external light path associated therewith, wherein the light transceiver
      transmits a first light beam at a first infrared wavelength, and
      receives a second light beam at a second infrared wavelength different from the first infrared wavelength, and wherein the first light beam and the second light beam are substantially parallel to each other and to the light path; and
   a path-steering device that controls the direction of the light path relative to a steering axis, wherein the path-steering device comprises
      a first beam-deviation optical element, including a first prism structure having a first diffraction grating thereon, comprising at least two first-structure prisms, wherein the first diffraction grating is on a surface of one of the first-structure prisms, and wherein the steering axis passes through the first beam-deviation optical element,
      a second beam-deviation optical element, including a second prism structure having a second diffraction grating thereon, wherein the steering axis passes through the second beam-deviation optical element, and
      a rotational drive operable to rotate at least one of the first beam-deviation optical element and the second beam-deviation optical element about the steering axis.

2. The optical device of claim 1, wherein the light transceiver
transmits the first light beam at the first infrared wavelength, and
simultaneously receives the second light beam at the second infrared wavelength.

3. The optical device of claim 1, wherein the first light beam and the second light beam are substantially coincident with each other and with the light path.

4. The optical device of claim 1, wherein the light transceiver comprises a light receiver operable at more than one wavelength.

5. The optical device of claim 1, wherein the light transceiver comprises a light receiver operable at more than one wavelength in the infrared.

6. The optical device of claim 1, wherein the first diffraction grating is a blazed diffraction grating.

7. The optical device of claim 1, wherein the first beam-deviation optical element comprises a single first-structure prism having the first diffraction grating on a surface thereof.

8. The optical device of claim 1, wherein the rotational drive is operable to rotate both the first beam-deviation optical element and the second beam-deviation optical element about the steering axis.

9. The optical device of claim 1, further including
a window through which the light path passes, and wherein the first beam-deviation optical element and the second beam-deviation optical element lie between the window and the light transceiver.

10. The optical device of claim 1, wherein the first beam-deviation optical element and the second beam-deviation optical element are made of a material selected from the group consisting of $Ge_{33}As_{12}Se_{55}$, zinc sulfide, silicon, calcium fluoride, and germanium.

11. A steerable-light-path optical device, comprising:
a light transceiver having an external light path associated therewith, wherein the light transceiver
transmits a first light beam at a first wavelength, and
receives a second light beam at a second wavelength, and wherein the first light beam and the second light beam are substantially parallel to each other and to the light path; and
a path-steering device that controls the direction of the light path relative to a steering axis, wherein the path-steering device comprises
a first beam-deviation optical element, including a first prism structure having a first diffraction grating thereon, comprising at least two first-structure prisms, wherein the first diffraction grating is on a surface of one of the first-structure prisms, and wherein the external light path passes through the first beam-deviation optical element,
a second beam-deviation optical element, including a second prism structure having a second diffraction grating thereon, wherein the external light path passes through the second beam-deviation optical element, and
a rotational drive operable to independently rotate the first beam-deviation optical element and the second beam-deviation optical element about the steering axis.

12. The optical device of claim 11, wherein the light transceiver comprises a light receiver operable at more than one wavelength.

13. The optical device of claim 11, wherein the light transceiver comprises a light receiver operable at more than one wavelength in the infrared.

14. The optical device of claim 11, wherein the first beam-deviation optical element comprises a single first-structure prism having the first diffraction grating on a surface thereof.

15. The optical device of claim 11, further including
a window through which the light path passes, and wherein the first beam-deviation optical element and the second beam-deviation optical element lie between the window and the light transceiver.

16. The optical device of claim 11, wherein the first beam-deviation optical element and the second beam-deviation optical element are made of a material selected from the group consisting of $Ge_{33}As_{12}Se_{55}$, zinc sulfide, silicon, calcium fluoride, and germanium.

17. A steerable-light-path optical device, comprising:
a light transceiver having an external light path associated therewith, wherein the light transceiver
transmits a first light beam at a first infrared wavelength, and
receives a second light beam at a second infrared wavelength different from the first infrared wavelength, and wherein the first light beam and the second light beam are substantially parallel to each other and to the light path; and
a path-steering device that controls the direction of the light path relative to a steering axis, wherein the path-steering device comprises
a first beam-deviation optical element, including a first prism structure having a first diffraction grating thereon, comprising at least two first-structure prisms, wherein each of the first-structure prisms is made of a transparent material having an index of refraction different from the index of refraction of the other first-structure prisms, wherein the first diffraction grating is on a surface of one of the first-structure prisms, and wherein the steering axis passes through the first beam-deviation optical element,
a second beam-deviation optical element, including a second prism structure having a second diffraction grating thereon, wherein the steeling axis passes through the second beam-deviation optical element, and
a rotational drive operable to rotate at least one of the first beam-deviation optical element and the second beam-deviation optical element about the steering axis.

18. The optical device of claim 17, wherein the light transceiver
transmits the first light beam at the first infrared wavelength, and
simultaneously receives the second light beam at the second infrared wavelength.

19. The optical device of claim 17, wherein the first light beam and the second light beam are substantially coincident with each other and with the light path.

20. The optical device of claim 17, wherein the light transceiver comprises a light receiver operable at more than one wavelength.

21. The optical device of claim 17, wherein the light transceiver comprises a light receiver operable at more than one wavelength in the infrared.

22. The optical device of claim 17, wherein the first diffraction grating is a blazed diffraction grating.

23. The optical device of claim 17, wherein the first beam-deviation optical element comprises a single first-structure prism having the first diffraction grating on a surface thereof.

24. The optical device of claim 17, wherein the rotational drive is operable to rotate both the first beam-deviation optical element and the second beam-deviation optical element about the steering axis.

25. The optical device of claim 17, further including
a window through which the light path passes, and wherein the first beam-deviation optical element and the second beam-deviation optical element lie between the window and the light transceiver.

26. The optical device of claim 17, wherein the first beam-deviation optical element and the second beam-deviation optical element are made of a material selected from the group consisting of $Ge_{33}As_{12}Se_{55}$, zinc sulfide, silicon, calcium fluoride, and germanium.

27. A steerable-light-path optical device, comprising:
a light transceiver having an external light path associated therewith, wherein the light transceiver
transmits a first light beam at a first infrared wavelength, and
receives a second light beam at a second infrared wavelength different from the first infrared wavelength, and wherein the first light beam and the second light beam are substantially parallel to each other and to the light path; and
a path-steering device that controls the direction of the light path relative to a steering axis, wherein the path-steering device comprises
a first beam-deviation optical element, including a first prism structure having a first diffraction grating thereon, comprising at least two first-structure prisms, wherein the first diffraction grating is on a surface of one of the first-structure prisms, and wherein the steering axis passes through the first beam-deviation optical element,
a second beam-deviation optical element, including a second prism structure having a second diffraction grating thereon, comprising at least two second-structure prisms, wherein the second diffraction grating is on a surface of one of the second-structure prisms, and wherein the steering axis passes through the second beam-deviation optical element, and
a rotational drive operable to rotate at least one of the first beam-deviation optical element and the second beam-deviation optical element about the steering axis.

28. The optical device of claim 27, wherein the light transceiver
transmits the first light beam at the first infrared wavelength, and
simultaneously receives the second light beam at the second infrared wavelength.

29. The optical device of claim 27, wherein the first light beam and the second light beam are substantially coincident with each other and with the light path.

30. The optical device of claim 27, wherein the light transceiver comprises a light receiver operable at more than one wavelength.

31. The optical device of claim 27, wherein the light transceiver comprises a light receiver operable at more than one wavelength in the infrared.

32. The optical device of claim 27, wherein the first diffraction grating is a blazed diffraction grating.

33. The optical device of claim 27, wherein the first beam-deviation optical element comprises a single first-structure prism having the first diffraction grating on a surface thereof.

34. The optical device of claim 27, wherein the rotational drive is operable to rotate both the first beam-deviation optical element and the second beam-deviation optical element about the steering axis.

35. The optical device of claim 27, further including
a window through which the light path passes, and wherein the first beam-deviation optical element and the second beam-deviation optical element lie between the window and the light transceiver.

36. The optical device of claim 27, wherein the first beam-deviation optical element and the second beam-deviation optical element are made of a material selected from the group consisting of $Ge_{33}As_{12}Se_{55}$, zinc sulfide, silicon, calcium fluoride, and germanium.

37. A steerable-light-path optical device, comprising:
a light transceiver having an external light path associated therewith, wherein the light transceiver
transmits a first light beam at a first infrared wavelength, and
receives a second light beam at a second infrared wavelength different from the first infrared wavelength, and wherein the first light beam and the second light beam are substantially parallel to each other and to the light path; and
a path-steering device that controls the direction of the light path relative to a steering axis, wherein the path-steering device comprises
a first beam-deviation optical element, including a first prism structure having a first diffraction grating thereon, comprising at least two first-structure prisms, wherein each of the first-structure prisms is made of a transparent material having an index of refraction different from the index of refraction of the other first-structure prisms, wherein the first diffraction grating is on a surface of one of the first-structure prisms, and wherein the external light path passes through the first beam-deviation optical element,
a second beam-deviation optical element, including a second prism structure having a second diffraction grating thereon, wherein the steering axis passes through the second beam-deviation optical element, and
a rotational drive operable to independently rotate the first beam-deviation optical element and the second beam-deviation optical element about the steering axis.

38. The optical device of claim 37, wherein the light transceiver comprises a light receiver operable at more than one wavelength.

39. The optical device of claim 37, wherein the light transceiver comprises a light receiver operable at more than one wavelength in the infrared.

40. The optical device of claim 37, wherein the first beam-deviation optical element comprises a single first-structure prism having the first diffraction grating on a surface thereof.

41. The optical device of claim 37, further including
a window through which the light path passes, and wherein the first beam-deviation optical element and the second beam-deviation optical element lie between the window and the light transceiver.

42. The optical device of claim 37, wherein the first beam-deviation optical element and the second beam-deviation optical element are made of a material selected from the group consisting of $Ge_{33}As_{12}Se_{55}$, zinc sulfide, silicon, calcium fluoride, and germanium.

43. A steerable-light-path optical device, comprising:
a light transceiver having an external light path associated therewith, wherein the light transceiver
  transmits a first light beam at a first infrared wavelength, and
  receives a second light beam at a second infrared wavelength different from the first infrared wavelength, and wherein the first light beam and the second light beam are substantially parallel to each other and to the light path; and
a path-steering device that controls the direction of the light path relative to a steering axis, wherein the path-steering device comprises
  a first beam-deviation optical element, including a first prism structure having a first diffraction grating thereon, comprising at least two first-structure prisms, wherein the first diffraction grating is on a surface of one of the first-structure prisms, and wherein the external light path passes through the second beam-deviation optical element,
  a second beam-deviation optical element, including a second prism structure having a second diffraction grating thereon, comprising at least two second-structure prisms, wherein the second diffraction grating is on a surface of one of the second-structure prisms, and wherein the external light path passes through the second beam-deviation optical element, and
  a rotational drive operable to independently rotate the first beam-deviation optical element and the second beam-deviation optical element about the steering axis.

44. The optical device of claim 43, wherein the light transceiver comprises a light receiver operable at more than one wavelength.

45. The optical device of claim 43, wherein the light transceiver comprises a light receiver operable at more than one wavelength in the infrared.

46. The optical device of claim 43, wherein the first beam-deviation optical element comprises a single first-structure prism having the first diffraction grating on a surface thereof.

47. The optical device of claim 43, further including
  a window through which the light path passes, and wherein the first beam-deviation optical element and the second beam-deviation optical element lie between the window and the light transceiver.

48. The optical device of claim 43, wherein the first beam-deviation optical element and the second beam-deviation optical element are made of a material selected from the group consisting of $Ge_{33}As_{12}Se_{55}$, zinc sulfide, silicon, calcium fluoride, and germanium.

* * * * *